US011807748B2

(12) United States Patent
Gupta et al.

(10) Patent No.: US 11,807,748 B2
(45) Date of Patent: Nov. 7, 2023

(54) INTERNALLY PLASTICIZED POLYVINYL CHLORIDE AND A PROCESS FOR PREPARATION THEREOF

(71) Applicant: RELIANCE INDUSTRIES LIMITED, Mumbai (IN)

(72) Inventors: Virendra Kumar Gupta, Mumbai (IN); Saurabh Kumar Tiwari, Amethi (IN); Ashok Misra, Bangalore (IN); Haribhau Shantaram Kumbhar, Jalgaon (IN)

(73) Assignee: RELIANCE INDUSTRIES LIMITED, Mumbai (IN)

( * ) Notice: Subject to any disclaimer, the term of this patent is extended or adjusted under 35 U.S.C. 154(b) by 229 days.

(21) Appl. No.: 17/425,460

(22) PCT Filed: Jan. 24, 2020

(86) PCT No.: PCT/IB2020/050560
§ 371 (c)(1),
(2) Date: Jul. 23, 2021

(87) PCT Pub. No.: WO2020/152637
PCT Pub. Date: Jul. 30, 2020

(65) Prior Publication Data
US 2022/0098396 A1    Mar. 31, 2022

(30) Foreign Application Priority Data

Jan. 25, 2019  (IN) .............................. 201821027921

(51) Int. Cl.
*C08L 27/06*    (2006.01)
*C08F 220/18*   (2006.01)
(Continued)

(52) U.S. Cl.
CPC ............ *C08L 27/06* (2013.01); *C08F 212/08* (2013.01); *C08F 218/08* (2013.01);
(Continued)

(58) Field of Classification Search
CPC .. C08L 27/06; C08L 2203/16; C08L 2203/18; C08L 2207/20; C08F 220/1804;
(Continued)

(56) References Cited

U.S. PATENT DOCUMENTS

| 4,423,193 A * | 12/1983 | Melby ................. C08F 259/04 |
| | | 525/367 |
| 5,382,636 A * | 1/1995 | Schmidt ............... C08F 283/02 |
| | | 525/186 |
| 2013/0137789 A1* | 5/2013 | Olsen ...................... C08K 5/12 |
| | | 524/114 |

FOREIGN PATENT DOCUMENTS

EP    0508057 A1    10/1992

OTHER PUBLICATIONS

Szarka et al. "Thermal Properties, Degradation and Stability of Poly(vinylchloride) Predegraded the rmooxidatively in the Presence of DioctylPhtalate Plasticizer", Journal of Molecular Science, Part A: Pure and Applied Chemistry (2013), 50(2), pp. 208-214 (Year: 2013).*

(Continued)

*Primary Examiner* — Michael M. Bernshteyn
(74) *Attorney, Agent, or Firm* — LADAS & PARRY LLP

(57) ABSTRACT

The present disclosure relates to an internally plasticized polyvinyl chloride resin and a process for preparation thereof. The internally plasticized polyvinyl chloride resin comprises a polyvinyl chloride (PVC) resin covalently bonded to at least one plasticizer. The process is simple and (Continued)

(A)

(B)

economical and provides internally plasticized PVC with enhanced flexibility, and improved characteristics than conventional PVC resin.

10 Claims, 3 Drawing Sheets (51) Int. Cl.
    C08F 212/08      (2006.01)
    C08F 218/08      (2006.01)
    C08F 220/44      (2006.01)
    C08F 222/06      (2006.01)
    C08F 222/26      (2006.01)
    C08K 5/00        (2006.01)
    C08K 5/04        (2006.01)
    C08K 5/315       (2006.01)
    C08K 5/14        (2006.01)

(52) U.S. Cl.
    CPC ...... *C08F 220/1804* (2020.02); *C08F 220/44* (2013.01); *C08F 222/06* (2013.01); *C08F 222/26* (2013.01); *C08K 5/0016* (2013.01); *C08K 5/14* (2013.01); *C08K 5/315* (2013.01); *C08L 2203/16* (2013.01); *C08L 2203/18* (2013.01); *C08L 2207/20* (2013.01)

(58) Field of Classification Search
    CPC .... C08F 220/44; C08F 212/08; C08F 218/08; C08F 222/06; C08F 222/26; C08K 5/0016; C08K 5/14; C08K 5/315
    USPC ........................................................ 525/239
    See application file for complete search history.

(56)     References Cited

OTHER PUBLICATIONS

Guo et al. "Polyene films prepared by poly(ethyleneglycol)s-catalyzed dehydrochlorination of poly(vinylchloride): chemical and electrochemical properties", Synthetic Metals (1999), 104(2), pp. 129-135. (Year: 1999).*

International Search Report & Written Opinion dated Apr. 27, 2020, in PCT Application No. PCT/IB2020/050560 filed on Jan. 24, 2020.

* cited by examiner (A)

INTERNALLY PLASTICIZED POLYVINYL CHLORIDE AND A PROCESS FOR PREPARATION THEREOF

RELATED APPLICATION

This application is an application under 35 U.S.C. 371 of International Application No. PCT/IB2020/050560 filed on 24 Jan. 2020, which claims priority from India Application 201821027921 filed 25 Jan. 2019, the disclosure of which are incorporated in their entirety by reference herein.

FIELD

The present disclosure relates to an internally plasticized polyvinyl chloride (PVC) and a process for preparation thereof.

DEFINITIONS

As used in the present disclosure, the following term is generally intended to have the meaning as set forth below, except to the extent that the context in which they are used to indicate otherwise.

Internally plasticized polyvinyl chloride resin refers to a polyvinyl chloride resin chemically bonded, by covalent bond, to at least one plasticizer monomer.

BACKGROUND

The background information herein below relates to the present disclosure but is not necessarily prior art.

Polyvinyl chloride (PVC) is a widely used thermoplastic material because of its relatively high chemical resistance, better barrier properties and economical nature. However, the thermal stability and processability/flexibility of PVC, which is a rigid and hard material, is relatively lower than other thermoplastic materials such as polyethylene, polypropylene, polyamide and the like. Moreover, PVC resin tends to degrade fast, upon heating, thus leading to colored samples due to liberation of hydrochloric acid. Further, a large amount of waste PVC resin is generated during manufacture of prime resin, which needs to be recycled; otherwise it could pose environment hazards.

The processability of PVC is commonly improved by the addition of fillers or plasticizers. Conventionally, PVC is physically mixed with plasticizers during processing to make it relatively more flexible However, this leads to non-covalent/physical attachment of the plasticizer to the PVC resin. Although, such physically plasticized PVC resin has good processability, however, when used in applications such as packaging, the plasticizer compound, being physically bonded to the PVC, tends to leach out from the packaged material thus causing contamination of the packaged material and possible health hazards.

There is, therefore, felt a need for a simple and economical process for preparing plasticized PVC resin that mitigates the drawbacks mentioned hereinabove.

OBJECTS

Some of the objects of the present disclosure, which at least one embodiment herein satisfies, are as follows.

It is an object of the present disclosure to ameliorate one or more problems of the prior art or to at least provide a useful alternative.

Another object of the present disclosure is to provide internally plasticized PVC having relatively better flexibility and relatively lesser leaching of plasticizer molecule.

Still another object of the present disclosure is to provide a simple and economical process for obtaining internally plasticized PVC resin having relatively better flexibility and relatively lesser leaching of plasticizer molecule.

Still another object of the present disclosure is to provide a simple and economical process for obtaining internally plasticized PVC resin from waste PVC resin.

Other objects and advantages of the present disclosure will be more apparent from the following description, which is not intended to limit the scope of the present disclosure.

SUMMARY

In one aspect, the present disclosure provides a process for preparing an internally plasticized polyvinyl chloride resin. The process comprises a step of treating thermally a polyvinyl chloride (PVC) resin to allow partial dehydrochlorination to obtain partially unsaturated polyvinyl chloride resin. The partially unsaturated polyvinyl chloride resin is mixed with a fluid medium to obtain slurry, wherein the fluid medium is at least one selected from the group consisting of 1-propanol, 2-propanol, 1-butanol, 1-pentanol, and ethylene glycol. The slurry is heated at a temperature in the range of 70° C. to 120° C. to obtain heated slurry. In the next step, at least one initiator and at least one plasticizer is added, under stirring, to the heated slurry to obtain a reaction mixture, wherein the plasticizer comprises allyl group, vinyl group or combination thereof. The reaction mixture is maintained, under stirring, at a temperature in the range of 100° C. to 130° C. for a time period in the range of 4 to 10 hours to obtain a product mixture comprising an internally plasticized polyvinyl chloride resin. The product mixture is filtered to obtain the internally plasticized polyvinyl chloride resin.

In another aspect, the present disclosure provides an internally plasticized polyvinyl chloride (PVC) resin comprising a polyvinyl chloride (PVC) resin covalently bonded to at least one plasticizer selected from the group consisting of diallyl phthalate, butyl acrylate, vinyl acetate, maleic anhydride, styrene, and acrylonitrile. The internally plasticized PVC resin is characterized by having average bulk density in the range of 0.45 g/mL to 0.55 g/mL, particle size diameter in the range of 130 µm to 150 µm, tensile strength in the range of 14-18 MPa, elongation yield in the range of 200-300% and elongation break in the range of 200-300%.

BRIEF DESCRIPTION OF THE ACCOMPANYING DRAWING

The internally plasticized PVC resin of the present disclosure will now be described with the help of the accompanying drawing, in which.

DETAILED DESCRIPTION

Embodiments. of the present disclosure, will now be described with reference to the accompanying drawing.

Embodiments are provided so as to thoroughly and fully convey the scope of the present disclosure to the person skilled in the art. Numerous details are set forth, relating to specific components, and methods, to provide a complete understanding of embodiments of the present disclosure. It will be apparent to the person skilled in the art that the details provided in the embodiments should not be construed to limit the scope of the present disclosure. In some embodiments, well-known processes, well-known apparatus structures, and well-known techniques are not described in detail.

The terminology used, in the present disclosure, is only for the purpose of explaining a particular embodiment and such terminology shall not be considered to limit the scope of the present disclosure. As used in the present disclosure, the forms "a," "an," and "the" may be intended to include the plural forms as well, unless the context clearly suggests otherwise. The terms "comprises," "comprising," "including," and "having," are open ended transitional phrases and therefore specify the presence of stated features, integers, steps, operations, elements, modules, units and/or components, but do not forbid the presence or addition of one or more other features, integers, steps, operations, elements, components, and/or groups thereof. The particular order of steps disclosed in the method and process of the present disclosure is not to be construed as necessarily requiring their performance as described or illustrated. It is also to be understood that additional or alternative steps may be employed.

The terms first, second, third, etc., should not be construed to limit the scope of the present disclosure as the aforementioned terms may be only used to distinguish one element, component, region, layer or section from another component, region, layer or section. Terms such as first, second, third etc., when used herein do not imply a specific sequence or order unless clearly suggested by the present disclosure.

Polyvinyl chloride (PVC) resin is a commonly used thermoplastic material because of its significant properties. However, the applicability of PVC gets limited in cases where high temperature processing is needed due to the rigid nature of PVC that degrades (via dehydrochlorination) upon heating.

The processability of PVC is improved by incorporation of additives such as tillers or plasticizers. The conventional processes involve physical mixing of plasticizers with PVC resin during extrusion that provides physical bonding of the plasticizer to the PVC resin. When such resins are used for packaging purposes, the plasticizer molecules of the PVC resin tends to leach out from the polymer matrix, thereby causing polymer outgassing, which not only degrades the plastic but also contaminates the contents of the package.

The present disclosure relates to the incorporation of plasticizers to form a chemical bond with the PVC resin which would not only prevent the leaching of the plasticizer molecule, but also greatly improves the properties of PVC resin.

The present disclosure relates to a simple and economical process to obtain an internally plasticized PVC resin. The internally plasticized PVC resin involves covalent bonding between the PVC resin and the plasticizer, thus resulting in relatively lesser leaching of the plasticizer than conventional PVC resin. The process of the present disclosure is environment friendly as it also provides an effective way to convert the waste PVC resin to valuable internally plasticized PVC resin, since a huge amount of PVC is generated as a waste during manufacture of prime resin, which is detrimental to the environment.

In one aspect, the present disclosure provides a process for preparing an internally plasticized polyvinyl chloride resin. The process comprises thermal treatment of a polyvinyl chloride (PVC) resin to allow partial dehydrochlorination to obtain partially unsaturated PVC resin.

The step of thermal treatment of the PVC resin is carried out in an air circulating oven at a temperature in the range of 150° C. to 200° C. for a time period in the range of 40 minutes to 60 minutes.

The thermal treatment leads to partial dehydrochlorination of the PVC resin, wherein hydrogen chloride molecule is eliminated, thus creating unsaturation in the PVC resin. The double bonds thus formed, react with plasticizer molecules, thus resulting in covalent attachment of the plasticizer with the PVC resin.

In an embodiment, the thermal treatment of the PVC resin is done by heating in an air circulating oven. In one exemplary embodiment, the PVC resin is heated in air circulating oven at 170° C. for 50 minutes. In another exemplary embodiment, the PVC resin is heated in air circulating oven at 190° C. for 50 minutes.

The thermal treatment is done in a controlled manner. The temperature range of 150° C. to 200° C., for thermal treatment, is significant for obtaining the required unsaturation, as below 150° C., the dehydrochlorination is not effective, whereas above 200° C. the dehydrochlorination is uncontrolled, causing excess unsaturation that negatively affects the characteristics of the final plasticized PVC resin.

The PVC resin becomes dark brown colored, upon thermal treatment, thereby indicating generation of unsaturation. The generation of desired unsaturation is checked by UV spectrophotometer.

The polyvinyl chloride (PVC) resin has chlorine content in the range of 56 wt % to 59 wt % and the partially unsaturated PVC resin obtained after step of thermal treatment has chlorine content in the range of 48 wt % to 55 wt %. In an embodiment, the polyvinyl chloride (PVC) resin has chlorine content of 59 wt %, wherein the partially unsaturated PVC resin after the step of thermal treatment has chlorine content of 49 wt %.

The polyvinyl chloride (PVC) resin has mean particle size in the range of 100 μm to 150 μm. In an embodiment, the polyvinyl chloride (PVC) resin has mean particle size of 130 μm.

In an embodiment, the PVC resin is waste PVC resin. The waste PVC resin is mainly generated during processes such as generation of prime PVC resin.

In accordance with the present disclosure, the waste PVC resin is cleaned prior to the step of thermal treatment. The waste PVC resin is obtained from waste sources and so is cleaned to remove the impurities such as dust, sand, carbon particles, iron particles and the like.

In an embodiment, the cleaning of the waste PVC resin comprises washing the waste PVC resin with water, followed by drying in a vacuum oven at a temperature in the range of 70° C. to 90° C. for a time period in the range of 1.5 hours to 4 hours. In an exemplary embodiment, the waste PVC resin is washed twice with demineralized water, followed by drying the waste PVC resin in a vacuum oven at 80° C. for a time period of 2 hours.

The present disclosure thus provides an economical process for converting waste PVC resin to a valuable plasticized PVC resin.

In the next step, the partially unsaturated PVC resin is mixed with a fluid medium to obtain slurry, wherein the fluid medium is at least one selected from the group consisting of 1-propanol, 2-propanol, 1-butanol, 1-pentanol, and ethylene glycol. The slurry is heated at a temperature in the range of 70° C. to 120° C. to obtain heated slurry.

The weight ratio of the unsaturated PVC resin and the fluid medium is in the range of 1:1.5 to 1:3. In an exemplary embodiment, the weight ratio of the unsaturated PVC resin and the fluid medium is 1:2.

The fluid medium is a high boiling solvent, which is added to provide a homogeneous reaction system, which does not evaporate at the reaction temperature.

In one exemplary embodiment, the unsaturated PVC resin is mixed with 1-butanol, to obtain the slurry which is heated at 110° C., to obtain the heated slurry. In another exemplary embodiment, the unsaturated PVC resin is mixed with 1-butanol, to obtain the slurry which is heated at 80° C., to obtain the heated slurry.

In the next step, at least one initiator and at least one plasticizer is added, under stirring, to the heated slurry to obtain a reaction mixture, wherein the plasticizer comprises allyl group, vinyl group or combination thereof.

The initiator is at least one selected from benzoyl peroxide and Azobis isobutyronitrile (AIBN). In an exemplary embodiment, the initiator is AIBN.

The amount of the initiator is in the range of 0.01 wt % to 0.08 wt % with respect to the partially unsaturated PVC resin. In an exemplary embodiment, the amount of the initiator is 0.02 wt % with respect to the partially unsaturated PVC resin.

The plasticizer is at least one monomer selected from the group consisting of acrylic monomer, vinyl monomer and allyl monomer.

In an embodiment, the plasticizer is at least one monomer selected from the group consisting of diallyl phthalate, butyl acrylate, vinyl acetate, maleic anhydride, styrene, and acrylonitrile.

In one exemplary embodiment, the plasticizer is diallyl phthalate. In another exemplary embodiment, the plasticizer is a mixture of butyl acrylate and styrene.

The amount of the plasticizer is in the range of 40 wt % to 60 wt % with respect to the partially unsaturated PVC. In an exemplary embodiment, the amount of the plasticizer is 50 wt % of the partially unsaturated PVC.

The mentioned range for the amount of the plasticizer is significant, as below 40 wt %, the quantity of plasticizer is insufficient for obtaining desired characteristics in the PVC resin.

The plasticizer is slowly added over a time period in the range of 5 minutes to 30 minutes. In an embodiment, the plasticizer is slowly added over a time period of 10 minutes.

The slow addition of the plasticizer is done for effective reaction of the plasticizer monomer with the double bonds in the partially unsaturated PVC resin.

In the next step, the reaction mixture is maintained, under stirring, at a temperature in the range of 100° C. to 130° C., for a time period in the range of 4 to 10 hours to obtain a product mixture comprising internally plasticized PVC resin. The product mixture is filtered to obtain the internally plasticized PVC resin.

The reaction mixture is maintained at the mentioned temperature range for effective grafting of the plasticizer monomer on the unsaturated PVC resin. The temperature range of 100° C. to 130° C. is significant, as below 100° C., the initiator activity is relatively low, whereas above 130° C. there is a tendency for loss of the fluid medium.

In accordance with the present disclosure, the plasticizer monomer has at least one terminal double bond, which reacts with the double bond of the partially unsaturated PVC, to generate the internally plasticized PVC, which creates a void space in between the PVC chains resulting in relatively enhanced flexibility as well as improved characteristics of the polymer.

In an exemplary embodiment, the reaction mixture is maintained, under stirring, at 115° C., for 6 hours.

The process further comprises washing the internally plasticized PVC resin, followed by drying under vacuum at a temperature in the range of 50° C. to 60° C.

The washing of the internally plasticized PVC resin is done with at least one solvent selected from methanol and water. In an embodiment, the internally plasticized PVC resin is washed with methanol followed by washing with water.

The washing of the internally plasticized PVC resin with the solvent is carried out to remove the unreacted plasticizer monomer.

In an embodiment, the drying of the internally plasticized PVC resin is carried out under vacuum at 60° C.

The drying is done to remove traces of solvent in the internally plasticized PVC resin.

In an exemplary embodiment, a polyvinyl chloride (PVC) resin is thermally treated to allow partial dehydrochlorination, to obtain partially unsaturated PVC resin. The partially unsaturated PVC resin is mixed with 1-butanol to obtain slurry. The slurry is heated at 115° C. to obtain heated slurry. In the next step, AIBN and diallyl phthalate are added, under stirring, to the heated slurry to obtain a reaction mixture. The reaction mixture is maintained, under stirring, at 115° C., for a time period of 6 hours to obtain a product mixture comprising internally plasticized PVC resin. The product mixture is filtered to obtain the internally plasticized PVC resin. The internally plasticized PVC resin is washed with methanol and water followed by drying under vacuum at 60° C.

In another aspect, the present disclosure provides an internally plasticized polyvinyl chloride resin comprising a polyvinyl chloride (PVC) resin covalently bonded to at least one plasticizer selected from the group consisting of diallyl phthalate, butyl acrylate, vinyl acetate, maleic anhydride, styrene, and acrylonitrile. The internally plasticized polyvinyl chloride is characterized by having an average bulk density in the range of 0.45 g/mL to 0.55 g/mL, particle size diameter in the range of 130 µm to 150 µm, tensile strength in the range of 14-18 MPa, elongation yield in the range of 200-300% and elongation break in the range of 200-300%.

In one exemplary embodiment, the internally plasticized polyvinyl chloride resin comprises a polyvinyl chloride (PVC) resin covalently bonded to plasticizer such as diallyl phthalate. In another exemplary embodiment, the internally plasticized polyvinyl chloride resin comprises a polyvinyl chloride (PVC) resin covalently bonded to plasticizer such as a combination of styrene and butyl acrylate.

In an exemplary embodiment, the average bulk density is 0.50 g/mL and the particle size diameter is 140 µm, the tensile strength is 16 MPa, the elongation yield is 244% and the elongation break is 250%.

The polyvinyl chloride resin is processed to obtain at least one product selected from the group consisting of flexible tubes, films, and solid processing aid for PVC extrusion. In an exemplary embodiment, the polyvinyl chloride resin is processed to obtain flexible tubes. The present disclosure provides a simple and economical process for preparing internally plasticized PVC resin. The internally plasticized PVC resin so obtained exhibits relatively lesser leaching of the plasticizer molecule than the conventional plasticized PVC resin comprising physically bonded plasticizer. The internally plasticized PVC resin has relatively enhanced flexibility and improved properties than starting material PVC resin. The present disclosure also provides an economical process for converting waste PVC resin to a valuable plasticized PVC resin.

The foregoing description of the embodiments has been provided for purposes of illustration and not intended to limit the scope of the present disclosure. Individual components of a particular embodiment are generally not limited to that particular embodiment, but, are interchangeable. Such variations are not to be regarded as a departure from the present disclosure, and all such modifications are considered to be within the scope of the present disclosure.

The present disclosure is further described in light of the following laboratory scale experiments which are set forth for illustration purpose only and not to be construed for limiting the scope of the disclosure. These laboratory scale experiments can be scaled up to industrial/commercial scale and the results obtained can be extrapolated to industrial/commercial scale.

EXPERIMENTAL DETAILS

Experiment 1: Preparation of Internally Plasticized PVC Sample 1 ((PVC/DAP Resin)

Step 1: Preparation of Partially Unsaturated PVC

PVC resin powder (K67-11 flexible grade) having chlorine content up to 57 wt % and mean particle size of 130 µm (200 g), was subjected to thermal treatment by heating in air circulating oven at 170° C. for 50 min. wherein hydrochloric acid (HCl) was liberated to obtain the partially unsaturated PVC resin having chlorine content upto 50 wt % as a pinkish brown colored product. The resin was washed with demineralized water to remove the trapped HCl and dried in a vacuum oven for 2 hours at 80° C.

Step 2: Preparation of Sample 1

100 gm of partially unsaturated PVC (obtained in step 1) was mixed in 1-butanol to obtain slurry. The slurry was heated to 115° C. to obtain heated slurry. A free radical initiator Azobis isobutyronitrile (AIBN) (0.02 wt. % of partially unsaturated PVC resin) was added to the heated slurry followed by the addition of diallyl phthalate (DAP) (50 g) in a dropwise manner by using the pressure equalizer funnel over 10 minutes, to obtain a reaction mixture. The reaction mixture was stirred at 115° C. for 6 hours to obtain a product mixture containing internally plasticized PVC resin, wherein the pinkish brown coloured resin became white coloured indicating the complete conversion of the product. The product mixture was poured into the cold methanol to obtain the white shining powder resin that separates the unreacted monomers from the product. The resin was separated by filtration and washed with methanol and distilled water for 4-5 times followed by drying in vacuum oven at 60° C. for 3 hours, to obtain the internally plasticized PVC resin (sample 1).

Experiment 2: Preparation of Internally Plasticized PVC Sample 2 (PVC/Styrene/Butyl Acrylate Resin)

Step 1: Preparation of Partially Unsaturated PVC

The partially unsaturated PVC was prepared by the same process as described in Experiment 1 (step 1).

Step 2: Preparation of Sample 2

100 gm of partially unsaturated PVC (obtained in step 1) was mixed in 1-butanol (250 mL) to obtain slurry. The slurry was heated to 80° C. to obtain heated slurry. A free radical initiator Azobis isobutylnitrile (AIBN) (0.02 wt. % of partially unsaturated PVC resin) was added to the heated slurry followed by the slow addition of styrene (50 gm) and butyl acrylate (50 gm) in a dropwise manner by using the pressure equalizer funnel over a time period of 10 minutes, to obtain a reaction mixture. The reaction mixture was stirred at 120° C. for a time period of 5 hours to obtain the product mixture containing internally plasticized PVC resin, wherein the pinkish brown coloured resin became white coloured indicating the complete conversion of the product. The product mixture was cooled, filtered and washed with methanol and distilled water for 4-5 times followed by drying in vacuum oven at 60° C. for 3 hours, to obtain the internally plasticized PVC resin (sample 2).

Experiment 3: Preparation of Internally Plasticized PVC Resin (sample 3) from Waste PVC Resin Step 1: Preparation of Partially Unsaturated PVC Waste PVC resin was washed with demineralized water (500 mL) twice, and separated by filtration followed by drying at 80° C. in a vacuum oven for 2 hrs. to obtain a pre-treated waste PVC resin. The pre-treated waste PVC resin (100 gm) was thermally treated by using the process as described in Experiment 1 (step 1), to obtain partially unsaturated PVC.

Step 2: Preparation of Sample 3

The sample 3 was prepared by using the process as described in Experiment 1 (step 2), to obtain sample 3 containing PVC resin internally plasticized with diallyl phthalate (50 gm).

Preparation of Conventional Physically Plasticized PVC Resin (Reference Sample A):

50 gm DAP was physically mixed in 100 gm PVC resin and 100 ml methanol solvent to obtain a slurry. The slurry was stirred properly for 30 min and then it was filtered. 100 mil fresh methanol was mixed again and stirred for 30 min and filtered. This process was repeated 3-4 times to obtain the physically plasticized PVC resin.

Figure 1:
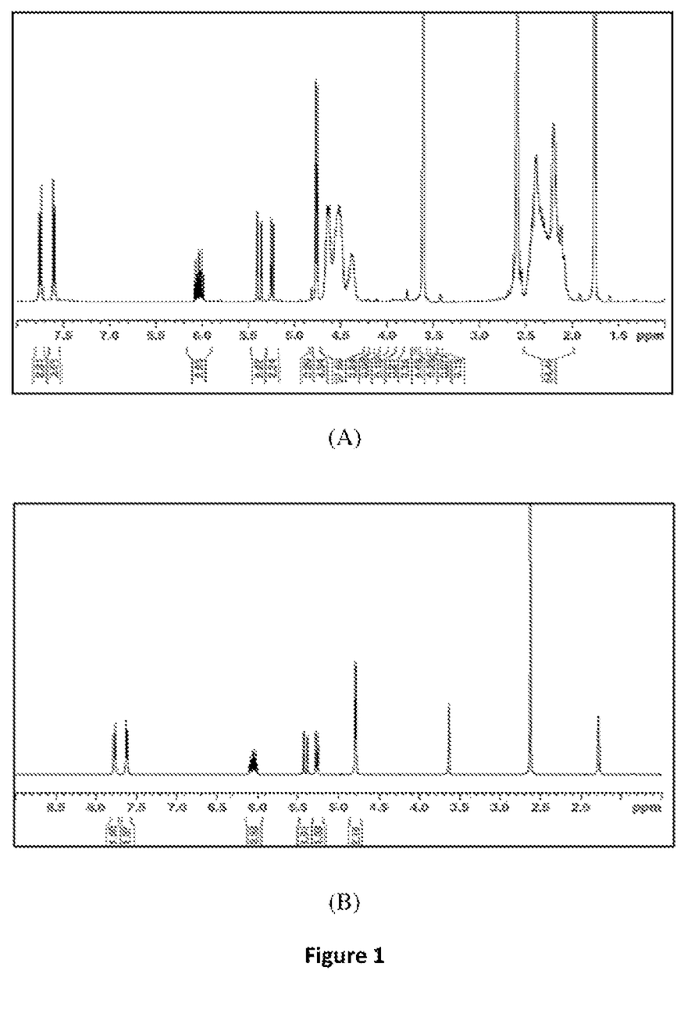
FIG. 1(A) illustrates $^1$H-NMR of an internally plasticized PVC resin (sample 1), prepared in accordance with the present disclosure.
FIG. 1(B) illustrates $^1$H-NMR of diallyl phthalate plasticizer monomer.

Characterization and Measurement of Physical Properties:

The sample 1 (PVC/DAP resin) was subjected to $^1$H-NMR measurements and the results were compared with diallyl phthalate (DAP) plasticizer monomer, as shown in FIG. 1(A) and FIG. 1(B) respectively. The $^1$H-NMR spectrum of the sample 1 i.e. the PVC resin internally plasticized with DAP, exhibits all the relevant peaks corresponding to the DAP monomer, thus indicating chemical bonding (covalent attachment) of the DAP plasticizer to the PVC resin.

Figure 2:
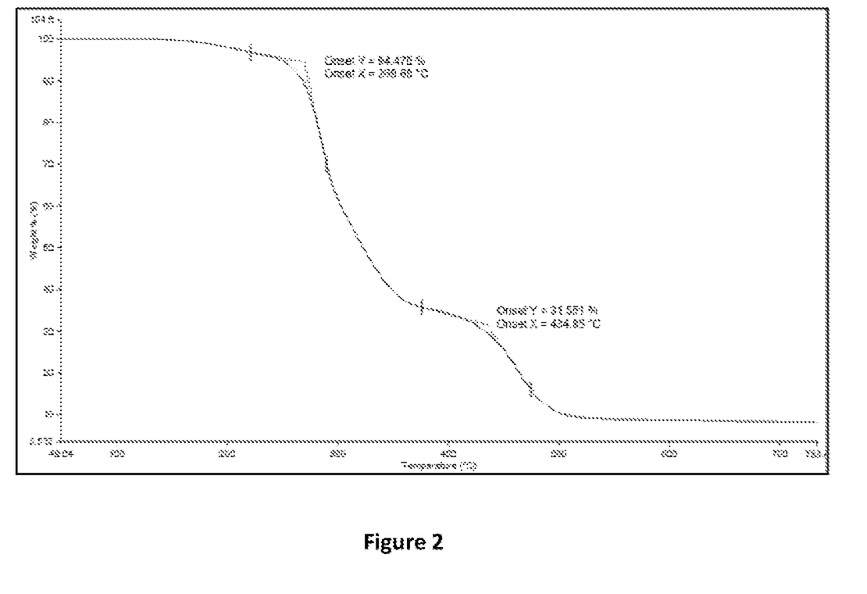
FIG. 2 illustrates thermo-gravimetric analysis (TGA) of the internally plasticized PVC resin (sample 1), prepared in accordance with the present disclosure.

The covalent attachment of the PVC resin internally plasticized with DAP (sample 1) is further confirmed by TGA analysis, as shown in FIG. 2, wherein the TGA shows two curves (onset at 94.5% and 31.5%) indicating two step degradation and both indicating the decomposition of PVC/DAP copolymer similar to PVC resin which also contain two step degradation.

The physical characteristics of the sample 1 (PVC/DAP resin) were tested and compared with un-plasticized PVC resin (blank).

TABLE 1

Testing of physical characteristics of internally plasticized resin sample 1 (PVC/DAP) and un-plasticized PVC resin (blank)

| Properties | PVC Resin (un-plasticized) | Sample 1 (PVC/DAP resin) |
| --- | --- | --- |
| Inherent Viscosity | 0.92 | 0.93 |
| Average Particle Size (in μm) | 132 | 135 |
| Bulk density (in g/ml) | 0.50 | 0.50 |
| Yellowness index | 3.9 | 4.2 |
| Whiteness Index | 87.8 | 85.6 |

As seen in Table 1, the properties of sample 1 were measured and compared with the properties of un-plasticized PVC resin. All the physical properties of internally plasticized PVC mentioned in the Table-1 are in the range of desired resin properties as compare to PVC resin.

Leaching Studies:

The sample 1, prepared as per the present disclosure, was tested for leaching studies. The leaching studies involved washing the sample 1 for 4 times with 200 ml methanol used in each cycle, followed by analysis to check the loss of plasticizer molecule (DAP) which has good solubility in methanol, to obtain washed sample 1. The washed sample 1 was subjected to FTIR measurements and the results were compared with the washed reference sample A (washed for 4 times), as illustrated in FIG. 3.

Figure 3:
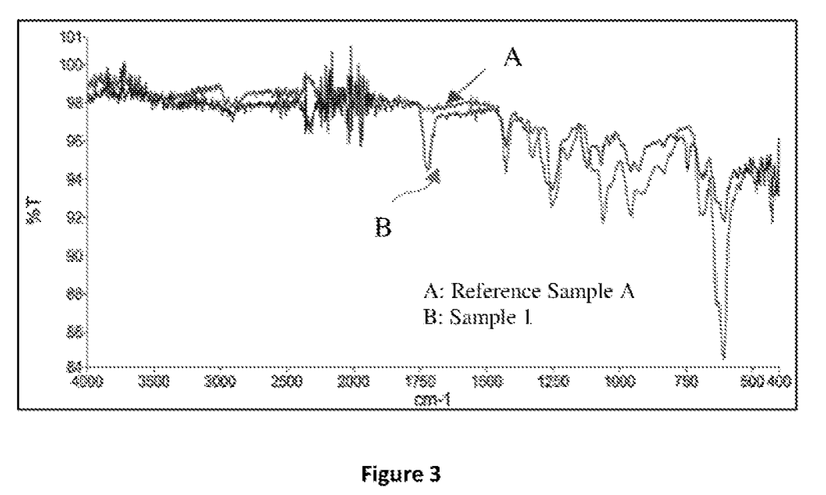
FIG. 3 illustrates FTIR spectra of the internally plasticized PVC resin (sample 1), prepared in accordance with the present disclosure, and the conventional physically plasticized PVC resin (Reference sample A).

It could be observed from FIG. 3, that the sample 1, having chemical bonding between the plasticizer and PVC resin, exhibits relatively lesser leaching after washing than the reference sample A (having physically bonding between the plasticizer and the PVC resin).

Manufacture of Flexible Tubing by Using Internally Plasticized PVC Resin:

The case of transforming internally plasticized PVC resin (prepared as per the present disclosure) to the melt form was studied. An internally plasticized PVC resin (sample 1, PVC/DAP resin) was transformed to molten form by using single screw extruder, followed by mixing and palletizing (under reaction parameters mentioned in Table 2), to obtain PVC flexible tubing sample (X).

Table 2 represents the processing parameters of internally plasticized PVC. Temperature profile was divided in 5 zones. Temperature of extruder was set in between 145-153° C. including different zone of extruder and die as shown in Table 2. Screw speed was 22.6 rpm with output of 28.6 Kg/hr.

TABLE 2

Reaction parameters for manufacture of PVC flexible tube (X)

Temperature profile

| Zone-1 | Zone-2 | Zone-3 | Zone4 | Zone -5 | Die-1 | Die-2 |
| --- | --- | --- | --- | --- | --- | --- |
| 149/145 | 146/145 Screw 22.6 rpm | 147/147 | 147/147 | 148/147 Output 28.6 kg/hr | 159/153 | 152/150 |

Conventional Flexible Tubing:

A conventional PVC flexible tubing (Y) was manufactured by using PVC resin wherein 25 wt % of a plasticizer, diallyl phthalate (DAP) was physically added.

The mechanical properties of internally plasticized PVC flexible tubing (X) and conventional PVC flexible tubing (Y) were compared and the results are summarized in Table 3.

TABLE 3

Testing of physical characteristics of internally plasticized PVC tubing (X) and the conventional PVC flexible tubing (Y)

| Sample | Tensile Strength (MPa) | Elongation Yield % | Elongation Break % |
| --- | --- | --- | --- |
| internally plasticized PVC flexible tubing (X), as per the present disclosure | 16 | 244 | 250 |
| Conventional PVC flexible tubing (Y) | 21 | 146 | 166 |

As observed in Table 3, the PVC sample tubing exhibited relatively higher elongation yield percentage as well as elongation break percentage indicating relatively higher flexibility than the conventional tubing. The elongation properties of internally plasticized PVC (X) is higher due to chemically bonded plasticizer to PVC chain which cause easier chain movement resulting in slightly lower tensile strength. In short, more elastic PVC material is less strong (lower tensile strength) but breaks at higher deformation. A higher strength means a harder PVC material hence less deformable material, so it is hardly deformed and breaks at lower strain.

Technical Advancements

The present disclosure described herein above has several technical advantages including, but not limited to, the realization of a process for preparing internally plasticized PVC resin, wherein the process:

is simple and economical;

provides internally plasticized PVC resin with relatively lesser leaching due to the presence of chemical bonding between plasticizer and PVC resin;

provides internally plasticized PVC from waste PVC resin; and provides internally plasticized PVC resin having enhanced flexibility and relatively improved characteristics than starting material PVC resin.

The embodiments herein and the various features and advantageous details thereof are explained with reference to the non-limiting embodiments in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The foregoing description of the specific embodiments so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

The use of the expression "at least" or "at least one" suggests the use of one or more elements or ingredients or quantities, as the use may be in the embodiment of the disclosure to achieve one or more of the desired objects or results.

Any discussion of documents, acts, materials, devices, articles or the like that has been included in this specification is solely for the purpose of providing a context for the disclosure. It is not to be taken as an admission that any or all of these matters form a part of the prior art base or were common general knowledge in the field relevant to the disclosure as it existed anywhere before the priority date of this application.

The numerical values mentioned for the various physical parameters, dimensions or quantities are only approximations and it is envisaged that the values higher/lower than the numerical values assigned to the parameters, dimensions or quantities fall within the scope of the disclosure, unless there is a statement in the specification specific to the contrary.

While considerable emphasis has been placed herein on the components and component parts of the preferred embodiments, it will be appreciated that many embodiments can be made and that many changes can be made in the preferred embodiments without departing from the principles of the disclosure. These and other changes in the preferred embodiment as well as other embodiments of the disclosure will be apparent to those skilled in the art from the disclosure herein, whereby it is to be distinctly understood that the foregoing descriptive matter is to be interpreted merely as illustrative of the disclosure and not as a limitation

The invention claimed is:

1. A process for preparing an internally plasticized poly vinyl chloride resin, said process comprising the following steps:
   (i) treating thermally a polyvinyl chloride (PVC) resin to allow partial dehydrochlorination to obtain partially unsaturated polyvinyl chloride resin;
   (ii) mixing the partially unsaturated polyvinyl chloride resin with a fluid medium to obtain a slurry, wherein said fluid medium is at least one selected from the group consisting of 1-propanol, 2-propanol, 1-butanol, 1-pentanol and ethylene glycol;
   (iii) heating the slurry at a temperature in the range of 70° C. to 120° C. to obtain heated slurry;
   (iv) adding at least one initiator and at least one plasticizer, under stirring, to the heated slurry to obtain a reaction mixture, wherein said plasticizer comprises allyl group, vinyl group or combination thereof;
   (v) maintaining the reaction mixture at a temperature in the range of 100° C. to 130° C., under stirring, for a time period in the range of 4 to 10 hours to obtain a product mixture comprising the internally plasticized polyvinyl chloride resin;
   (vi) filtering the product mixture to obtain the internally plasticized polyvinyl chloride resin: and wherein the PVC resin has a chlorine content in the range of 56 wt % to 59 wt %, and the partially unsaturated PVC resin obtained after step (i) of thermal treatment has chlorine in the range of 48 wt % to 55 wt %.

2. The process as claimed in claim 1, wherein the PVC resin is waste PVC resin, wherein said waste PVC resin is cleaned prior to step (i) of thermal treatment.

3. The process as claimed in claim 1, wherein step (i) of thermal treatment of the polyvinyl chloride resin is carried out in an air circulating oven at a temperature in the range of 150° C. to 200° C., for a time period in the range of 40 minutes to 60 minutes.

4. The process as claimed in claim 1, wherein said initiator is at least one selected from benzoyl peroxide and azobis isobutyronitrile (AIBN), or wherein the amount of the initiator is in the range of 0.01 wt % to 0.08 wt % with respect to the PVC resin.

5. The process as claimed in claim 1, wherein said plasticizer is at least one monomer selected from the group consisting of acrylic monomer, vinyl monomer and allyl monomer, or wherein the amount of said plasticizer is in the range of 40 wt % to 60 wt % with respect to the partially unsaturated PVC.

6. The process as claimed in claim 5, wherein said plasticizer is at least one monomer selected from the group consisting of diallyl phthalate, butyl acrylate, vinyl acetate, maleic anhydride, styrene, and acrylonitrile.

7. The process as claimed in claim 1, wherein said plasticizer is added over a time period in the range of 5 minutes to 30 minutes.

8. The process as claimed in claim 1, wherein the process further comprises washing said internally plasticized PVC resin with at least one solvent selected from methanol and water, followed by drying under vacuum at a temperature in the range of 50° C. to 60° C.

9. An internally plasticized polyvinyl chloride resin prepared by the process of claim 1 or any one of claims 2-8 comprising a polyvinyl chloride (PVC) resin covalently bonded to at least one plasticizer selected from the group consisting of diallyl phthalate, butyl acrylate, vinyl acetate, maleic anhydride, styrene and acrylonitrile, wherein said internally plasticized polyvinyl chloride resin is having an average bulk density in the range of 0.45 g/mL to 0.55 g/mL, a particle size diameter in the range of 130 μm to 150 μm, a tensile strength in the range of 14-18 MPa, an elongation yield in the range of 200-300% and an elongation break in the range of 200-300%.

10. The polyvinyl chloride resin as claimed in claim 9, wherein the resin is processed to obtain at least one product selected from the group consisting of flexible tubes, films, and solid processing aid for PVC extrusion.

* * * * *